United States Patent
Krishan et al.

(10) Patent No.: US 11,425,598 B2
(45) Date of Patent: Aug. 23, 2022

(54) METHODS, SYSTEMS, AND COMPUTER READABLE MEDIA FOR RULES-BASED OVERLOAD CONTROL FOR 5G SERVICING

(71) Applicant: Oracle International Corporation, Redwood Shores, CA (US)

(72) Inventors: Rajiv Krishan, Bangalore (IN); Rajdeep Yadav, Gurgaon (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 8 days.

(21) Appl. No.: 16/914,231

(22) Filed: Jun. 26, 2020

(65) Prior Publication Data
US 2021/0112443 A1  Apr. 15, 2021

Related U.S. Application Data

(63) Continuation-in-part of application No. 16/601,371, filed on Oct. 14, 2019, now Pat. No. 11,102,138.

(51) Int. Cl.
*H04W 28/02* (2009.01)
*H04W 28/08* (2009.01)
(Continued)

(52) U.S. Cl.
CPC ... *H04W 28/0289* (2013.01); *H04W 28/0842* (2020.05); *H04W 28/0925* (2020.05);
(Continued)

(58) Field of Classification Search
None
See application file for complete search history.

(56) References Cited

U.S. PATENT DOCUMENTS 5,084,816 A  1/1992 Boese et al.
5,253,248 A  10/1993 Dravida et al.
(Continued)

FOREIGN PATENT DOCUMENTS

CN  105474683 A  4/2016
EP  3 280 099 A1  2/2018
(Continued)

OTHER PUBLICATIONS

"3rd Generation Partnership Project;Technical Specification Group Core Network and Terminals; 5G System; Session Management Policy Control Service; Stage 3 (Release 16)," 3GPP TS 29.512, V16.4.0, pp. 1-186 (Mar. 2020).
(Continued)

*Primary Examiner* — Anh Ngoc M Nguyen
(74) *Attorney, Agent, or Firm* — Jenkins, Wilson, Taylor & Hunt, P.A.

(57) ABSTRACT

A method for rules-based overload control for 5G services includes configuring, at an intermediate or a producer network function (NF), overload message handing rules, wherein at least some of the rules include destination network name (DNN), network subscription, network location, or a network slice identifying parameter or any parameter/attribute defined by 3GPP/vendor as rule selection criteria. The method includes a guaranteed processing bandwidth of the intermediate or producer NF with at least some of the overload message handling rules, receiving a first message at the intermediate or producer NF, determining that an overload condition exists, identifying that the first message includes parameters that match the rule selection criteria for one of the overload message handling rules, determining, that a portion of the guaranteed processing bandwidth of the intermediate or producer NF for the matching overload message handling rule is available to
(Continued)

process the first message, processing the first message, and updating a message count for the overload message handling rule.

20 Claims, 6 Drawing Sheets

(51) Int. Cl.
*H04W 28/20* (2009.01)
*H04W 28/26* (2009.01)
*H04W 88/18* (2009.01)

(52) U.S. Cl.
CPC .......... *H04W 28/20* (2013.01); *H04W 28/26* (2013.01); *H04W 88/182* (2013.01)

(56) References Cited

U.S. PATENT DOCUMENTS

| | | | |
|---|---|---|---|
| 5,381,413 A | 1/1995 | Tobagi et al. | |
| 5,915,013 A | 6/1999 | Mintz et al. | |
| 5,933,474 A | 8/1999 | Kipp | |
| 6,018,515 A | 1/2000 | Sorber | |
| 6,115,383 A | 9/2000 | Bell et al. | |
| 6,212,164 B1 | 4/2001 | Murakami et al. | |
| 6,215,765 B1 | 4/2001 | McAllister et al. | |
| 6,606,379 B2 | 8/2003 | Khadri et al. | |
| 6,704,287 B1 | 3/2004 | Moharram | |
| 6,747,955 B1 | 6/2004 | Archer | |
| 6,748,435 B1 | 6/2004 | Wang et al. | |
| 6,839,423 B2 | 1/2005 | Khadri et al. | |
| 6,996,225 B1 | 2/2006 | Bordonaro et al. | |
| 7,324,451 B2 | 1/2008 | Hanif et al. | |
| 7,782,776 B2 | 8/2010 | Shankar et al. | |
| 8,014,510 B2 | 9/2011 | Bordonaro et al. | |
| 8,023,482 B2 | 9/2011 | Gong et al. | |
| 8,547,846 B1 | 10/2013 | Ma et al. | |
| 8,645,565 B2 | 2/2014 | Sparks et al. | |
| 8,879,431 B2 | 11/2014 | Ridel et al. | |
| 8,903,074 B2 | 12/2014 | Delaney et al. | |
| 8,954,080 B2 | 2/2015 | Janakiraman et al. | |
| 9,112,784 B2 | 8/2015 | Chen et al. | |
| 10,291,539 B2 | 5/2019 | Krishan et al. | |
| 10,299,128 B1 | 5/2019 | Suthar et al. | |
| 10,361,843 B1 | 7/2019 | Suthar et al. | |
| 10,595,256 B1 | 3/2020 | Marupaduga et al. | |
| 10,609,154 B2 | 3/2020 | Talebi Fard et al. | |
| 10,616,934 B2 | 4/2020 | Talebi Fard et al. | |
| 10,778,527 B2 | 9/2020 | Assali et al. | |
| 10,819,636 B1 | 10/2020 | Goel | |
| 10,880,370 B2 | 12/2020 | Seenappa et al. | |
| 11,102,138 B2 | 8/2021 | Krishan et al. | |
| 11,159,359 B2 | 10/2021 | Goel | |
| 2001/0049730 A1 | 12/2001 | Brendes et al. | |
| 2002/0093910 A1 | 7/2002 | Yazaki et al. | |
| 2003/0174649 A1 | 9/2003 | Shankar et al. | |
| 2003/0223414 A1 | 12/2003 | Wong | |
| 2004/0003069 A1 | 1/2004 | Wong | |
| 2004/0208183 A1 | 10/2004 | Balachandran et al. | |
| 2005/0144309 A1 | 6/2005 | Gish | |
| 2006/0198508 A1 | 9/2006 | Delaney et al. | |
| 2007/0237074 A1 | 10/2007 | Curry | |
| 2007/0242738 A1 | 10/2007 | Park et al. | |
| 2009/0055835 A1 | 2/2009 | Zhu | |
| 2009/0135729 A1* | 5/2009 | Saffre .................. H04L 47/745 370/252 | |
| 2009/0141625 A1 | 6/2009 | Ghai et al. | |
| 2011/0202604 A1 | 8/2011 | Craig et al. | |
| 2011/0239226 A1 | 9/2011 | Placanica | |
| 2013/0029708 A1 | 1/2013 | Fox et al. | |
| 2013/0039176 A1 | 2/2013 | Kanode et al. | |
| 2014/0040975 A1 | 2/2014 | Raleigh et al. | |
| 2014/0328172 A1 | 11/2014 | Kumar et al. | |
| 2015/0016266 A1 | 1/2015 | Dumitrescu et al. | |
| 2015/0071074 A1 | 3/2015 | Zaidi et al. | |
| 2015/0263987 A1 | 9/2015 | Klein et al. | |
| 2016/0104377 A1 | 4/2016 | French et al. | |
| 2016/0142324 A1 | 5/2016 | Vihtari et al. | |
| 2016/0164788 A1 | 6/2016 | Goel et al. | |
| 2016/0234119 A1 | 8/2016 | Zaidi et al. | |
| 2016/0315743 A1 | 10/2016 | Nagaraj et al. | |
| 2016/0352588 A1 | 12/2016 | Subbarayan et al. | |
| 2018/0057368 A1 | 3/2018 | Hubrig et al. | |
| 2018/0083882 A1 | 3/2018 | Krishan et al. | |
| 2018/0159780 A1 | 6/2018 | Essigmann et al. | |
| 2018/0173549 A1 | 6/2018 | Browne et al. | |
| 2018/0183724 A1 | 6/2018 | Callard et al. | |
| 2018/0324646 A1 | 11/2018 | Lee et al. | |
| 2018/0343567 A1 | 11/2018 | Ashrafi | |
| 2019/0045351 A1 | 2/2019 | Zee et al. | |
| 2019/0075552 A1 | 3/2019 | Yu et al. | |
| 2019/0116486 A1 | 4/2019 | Kim et al. | |
| 2019/0116521 A1 | 4/2019 | Qiao et al. | |
| 2019/0158364 A1 | 5/2019 | Zhang et al. | |
| 2019/0173740 A1 | 6/2019 | Zhang et al. | |
| 2019/0174561 A1 | 6/2019 | Sivavakeesar | |
| 2019/0182875 A1 | 6/2019 | Talebi Fard et al. | |
| 2019/0191348 A1 | 6/2019 | Futaki et al. | |
| 2019/0191467 A1 | 6/2019 | Dao et al. | |
| 2019/0223093 A1 | 7/2019 | Watfa et al. | |
| 2019/0261244 A1 | 8/2019 | Jung et al. | |
| 2019/0268270 A1 | 8/2019 | Fattah | |
| 2019/0306907 A1 | 10/2019 | Andreoli-Fang et al. | |
| 2019/0313236 A1 | 10/2019 | Lee et al. | |
| 2019/0313437 A1 | 10/2019 | Jung et al. | |
| 2019/0313469 A1 | 10/2019 | Karampatsis et al. | |
| 2019/0335002 A1 | 10/2019 | Bogineni et al. | |
| 2019/0335534 A1 | 10/2019 | Atarius et al. | |
| 2019/0342921 A1 | 11/2019 | Loehr et al. | |
| 2019/0349901 A1 | 11/2019 | Basu Mallick et al. | |
| 2019/0357092 A1 | 11/2019 | Jung et al. | |
| 2019/0380031 A1 | 12/2019 | Suthar et al. | |
| 2019/0394624 A1 | 12/2019 | Karampatsis et al. | |
| 2019/0394833 A1 | 12/2019 | Talebi Fard et al. | |
| 2020/0008069 A1 | 1/2020 | Zhu et al. | |
| 2020/0028920 A1 | 1/2020 | Livanos et al. | |
| 2020/0045753 A1 | 2/2020 | Dao et al. | |
| 2020/0045767 A1 | 2/2020 | Velev et al. | |
| 2020/0053670 A1 | 2/2020 | Jung et al. | |
| 2020/0053724 A1 | 2/2020 | MolavianJazi et al. | |
| 2020/0053828 A1 | 2/2020 | Bharatia et al. | |
| 2020/0059856 A1 | 2/2020 | Cui et al. | |
| 2020/0084663 A1 | 3/2020 | Park et al. | |
| 2020/0092423 A1 | 3/2020 | Qiao et al. | |
| 2020/0092424 A1 | 3/2020 | Qiao et al. | |
| 2020/0099629 A1 | 3/2020 | Wu et al. | |
| 2020/0136911 A1 | 4/2020 | Assali et al. | |
| 2020/0177629 A1 | 6/2020 | Hooda et al. | |
| 2020/0412597 A1 | 12/2020 | Goel et al. | |
| 2021/0112012 A1 | 4/2021 | Krishan et al. | |

FOREIGN PATENT DOCUMENTS

| | | | |
|---|---|---|---|
| EP | 3 516 833 B1 | 11/2021 | |
| JP | 2008-205721 A | 9/2008 | |
| JP | 7030815 B2 | 3/2022 | |
| WO | WO 2006/096597 A2 | 9/2006 | |
| WO | WO 2007/126352 A1 | 11/2007 | |
| WO | WO 2012/065477 A1 | 5/2012 | |
| WO | WO 2015/139726 A1 | 9/2015 | |
| WO | WO-2018/057368 | 3/2018 | |
| WO | WO 2018/174021 A1 | 9/2018 | |
| WO | WO 2018/174516 A1 | 9/2018 | |
| WO | WO 2019/034609 A1 | 2/2019 | |
| WO | WO-2019034609 A1 * | 2/2019 | ............. H04W 4/50 |
| WO | WO 2019/096586 A1 | 5/2019 | |
| WO | WO 2019/154295 A1 | 8/2019 | |
| WO | WO 2019/154476 A1 | 8/2019 | |
| WO | WO 2019/220172 A1 | 11/2019 | |

(56) References Cited

FOREIGN PATENT DOCUMENTS

| WO | WO 2020/263486 A1 | 12/2020 |
| WO | WO 2021/076277 A1 | 4/2021 |

OTHER PUBLICATIONS

Commonly-assigned, co-pending U.S. Appl. No. 16/601,371 for "Methods, Systems, and Computer Readable Media for Providing Guaranteed Traffic Bandwidth for Services at Intermediate Proxy Nodes," (Unpublished, filed Oct. 14, 2019).

"3rd Generation Partnership Project; Technical Specification Group Core Network and Terminals; 5G System; Network Function Repository Services; Stage 3 (Release 16)," 3GPP TS 29.510, V16.0.0,pp. 1-135 (Jun. 2019).

"3rd Generation Partnership Project; Technical Specification Group Core Network and Terminals; 5G System; Technical Realization of Service Based Architecture; Stage 3 (Release 16)," 3GPP TS 29.500, V16.0.0, pp. 1-36 (Jun. 2019).

Notice of Allowance and Fee(s) Due and Applicant-Initiated Interview Summary for U.S. Appl. No. 15/273,069 (dated Jan. 3, 2019).

Final Office Action for U.S. Appl. No. 15/273,069 (dated Sep. 14, 2018).

"3rd Generation Partnership Project; Technical Specification Group Services and System Aspects; Study on Enhancements to the Service-Based Architecture (Release 16)," 3GPP TR 23.742, V0.3.0, pp. 1-64 (Jul. 2018).

Non-Final Office Action for U.S. Appl. No. 15/273,069 (dated Mar. 7, 2018).

Notification of Transmittal of the International Search Report and the Written Opinion of the International Searching Authority, or the Declaration for International Application No. PCT/US2017/051351 (dated Dec. 13, 2017).

Scholl et al., "An API First Approach to Microservices Development," Oracle, https://blogs.oracle.com/developers/an-api-first-approach-to-microservices-development, pp. 1-12 (Nov. 8, 2017).

Notice of Allowance and Fee(s) Due & Interview Summary for U.S. Appl. No. 11/071,946 (dated Aug. 12, 2014).

Applicant-Initiated Interview Summary for U.S. Appl. No. 11/071,946 (dated May 14, 2014).

Final Office Action for U.S. Appl. No. 11/071,946 (dated Mar. 6, 2014).

"Cisco IOS Quality of Service Solutions Configuration Guide, Release 12.2," Chapter: Policing and Shaping Overview, Cisco http://www.cisco.com/c/en/us/td/docs/ios/12_2/qos/configuration/guide/fqos_c/qcfpolsh.html, pp. 1-15 (Jan. 30, 2014).

Non-Final Office Action for U.S. Appl. No. 11/071,946 (dated Aug. 15, 2013).

Interview Summary for U.S. Appl. No. 11/071,946 (dated Aug. 20, 2010).

Final Office Action for U.S. Appl. No. 11/071,946 (dated Mar. 18, 2010).

Interview Summary for U.S. Appl. No. 11/071,946 (dated Dec. 14, 2009).

Non-Final Office Action for U.S. Appl. No. 11/071,946 (dated Jul. 7, 2009).

Non-Final Office Action for U.S. Appl. No. 11/071,946 (dated Dec. 10, 2008).

Notification of Transmittal of the International Search Report and the Written Opinion of the International Searching Authority, or the Declaration for International Application No. PCT/US06/07838 (dated Feb. 5, 2007 .

Pietzuch et al., "Congestion Control in a Reliable Scalable Message-Oriented Middleware," University of Cambridge Computer Laboratory, Cambridge, United Kingdom, ACM/IFIP/USENIX Int. Middleware Conference, Springer-Verlag, https://www.doc.ic.ac.uk/~prp/manager/doc/mw2003_cc_gryphon.pdf, pp. 1-20 (2003).

Russell, "Signaling System #7," Third Edition, Chapter 6, pp. 230-232 (Copyright 2000).

Notification of Transmittal of the International Search Report and the Written Opinion of the International Searching Authority, or the Declaration for International Application Serial No. PCT/US2020/051885 (dated Dec. 18, 2020).

Communication pursuant to Article 94(3) EPC for European Patent Application Serial No. 17 772 559.5 (dated Nov. 13, 2020).

Examination Report for Indian Patent Application Serial No. 201947009631 (dated Oct. 22, 2020).

Notice of Allowance and Fee(s) Due for U.S. Appl. No. 16/176,920 (dated Apr. 16, 2020).

Applicant-Initiated Interview Summary for U.S. Appl. No. 16/176,920 (dated Apr. 1, 2020).

Non-Final Office Action for U.S. Appl. No. 16/176,920 (dated Mar. 6, 2020).

"5G; Procedures for the 5G System (3GPP TS 23.502 version 15.2.0 Release 15)," ETSI TS 123 502 V15.2.0, pp. 1-46 (Jun. 2018).

Decision of Refusal for Japanese Patent Application Serial No. 2019-536462 (dated Jul. 13, 2021).

Notification of Transmittal of the International Search Report and the Written Opinoin of the International Searching Authority, or the Declaration for International Application No. PCT/US2021/020115 (dated Jun. 23, 2021).

Communication under Rule 71 (3) EPC Intention to Grant for European Patent Application Serial No. 17 772 559.5 (dated Jun. 4, 2021).

Notice of Allowance and Fee(s) Due for U.S. Appl. No. 16/601,371 (dated Apr. 26, 2021).

Notice of Allowance and Fee(s) Due for U.S. Appl. No. 16/697,021 (dated Jun. 21, 2021).

Advisory Action for U.S. Appl. No. 16/697,021 (dated May 7, 2021).

Final Office Action for U.S. Appl. No. 16/697,021 (dated Feb. 2, 2021).

Applicant-Initiated Interview Summary for U.S. Appl. No. 16/697,021 (dated Jan. 26, 2021).

Advisory Action for U.S. Appl. No. 16/356,446 (dated Dec. 22, 2020).

Non-Final Office Action for U.S. Appl. No. 16/697,021 (dated Sep. 29, 2020).

Notice of Allowance and Fee(s) Due and Examiner-Initiated Interview Summary for U.S. Appl. No. 16/453,955 (dated Aug. 26, 2020).

Commonly-assigned, co-pending U.S. Appl. No. 16/697,021 for "Methods, Systems, and Computer Readable Media for Diameter-Peer-Wide Egress Rate Limiting at Diameter Relay Agent (DRA)," (Unpublished, filed Nov. 27, 2019).

"3rd Generation Partnership Project; Technical Specification Group Services and System Aspects; Architecture enhancements to facilitate communications with packet data networks and applications (Release 16)," 3GPP TS 23.682, V16.4.0, pp. 1-30 (Sep. 2019).

"Diameter and Diameter Applications," Alcatel-Lucent, pp. 1-40 (Aug. 22, 2019).

Commonly-assigned, co-pending U.S. Appl. No. 16/453,955 for "Methods, Systems, and Computer Readable Media for Producer Network Function (NF) Service Instance Wide Egress Rate Limiting at Service Communication Proxy (SCP)," (Unpublished, filed Jun. 26, 2019).

"Class of Service Feature Guide (Routers and EX9200 Switches)," Junos® OS, Juniper Networks, pp. 1-1530 (Apr. 10, 2019).

"3rd Generation Partnership Project; Technical Specification Group Services and System Aspects; System Architecture and 5G; Stage 2 (Release 16)," 3GPP TS 23.501, V16.0.0, pp. 1-318 (Mar. 2019).

"Oracle Communications Diameter Signaling Router," Release Notice, Release 8.3, E93179 Revision 02, Oracle, pp. 1-98 (Dec. 2018).

"Addressing 5G Network Function Requirements," Intel® FPGAs and Intel PAC 5G QoS and IPSec Benchmarking, White Paper, pp. 1-8 (Oct. 2018).

"CPS vDRA Configuration Guide," Release 18.3.0 (Restricted Release)(1), Cisco, pp. 1-130 (Sep. 14, 2018).

"How To Do Rate Limiting of Diameter Messages Using NetScaler," Citrix Systems Inc., pp. 1-3 (Sep. 4, 2018).

(56) References Cited

OTHER PUBLICATIONS

"5G; 5G System; Technical Realization of Service Based Architecture; Stage 3 (3GPP TS 29.500 version 15.0.0 Release 15)," ETSI TS 129 500, V15.0.0, pp. 1-29 (Jul. 2018).
Benacer et al., "A High-Speed Traffic Manager Architecture for Flow-Based Networking," pp. 1-4 (2017).
"Dynamically Reconfigurable Optical-Wireless Backhaul/Fronthaul with Cognitive Control Plane for Small Cells and Cloud-RANs: D3.1 Analysis of state of the art on scalable control plane design and techniques for user mobility awareness. Definition of 5G-XHaul control plane requirements," European Commission, 5G-XHaul, pp. 1-107 (Jun. 31, 2016).
"Multi-Layer Security Protection for Signaling Networks," Oracle Communications, Oracle white paper, pp. 1-9 (Jan. 2016).
Fajardo et al., "Diameter Based Protocol," Internet Engineering Task Force (IETF) Request for Comments: 6733, pp. 1-152 (Oct. 2012).
Decision to Grant for European Patent Application Serial No. 17772559.5 (dated Oct. 14, 2021).
Notice of Allowance for Chinese Patent Application Serial No. 201780058408.6 (dated Mar. 28, 2022).
Hearing Notice of Indian Patent Application Serial No. 201947009631 (Apr. 5, 2022).
Decision to Grant for Japanese Patent Application Serial No. 2019-536462 (dated Jan. 25, 2022).

\* cited by examiner

METHODS, SYSTEMS, AND COMPUTER READABLE MEDIA FOR RULES-BASED OVERLOAD CONTROL FOR 5G SERVICING

PRIORITY APPLICATION

This application is a continuation-in-part of U.S. patent application Ser. No. 16/601,371, filed Oct. 14, 2019, the disclosure of which is incorporated herein by reference in its entirety.

TECHNICAL FIELD

The subject matter described herein relates to providing overload control in communications networks. More particularly, the subject matter described herein relates providing rules-based overload control for 5G servicing.

BACKGROUND

In 5G telecommunications networks, the network node that provides service is referred to as a producer network function (NF). A network node that consumes services is referred to as a consumer NF. A network function can be both a producer NF and a consumer NF depending on whether it is consuming or providing service.

A given producer NF may have many service endpoints, where a service endpoint is a combination of IP address and port number on a network node that hosts a producer NF. Producer NFs register with a network function repository function (NRF). The NRF maintains an NF profile of available NF instances and their supported services. Consumer NFs can subscribe to receive information about producer NF instances that have registered with the NRF.

In addition to consumer NFs, another type of network node that can subscribe to receive information about NF service instances is a service communications proxy (SCP). The SCP subscribes with the NRF and obtains reachability and service profile information regarding producer NF service instances. Consumer NFs connect to the service communications proxy, and the service communications proxy load balances traffic among producer NF service instances that provide the required service or directly routes the traffic to the destination producer NF.

In addition to the SCP, other examples of intermediate proxy nodes or groups of network nodes that route traffic between producer and consumer NFs include the security edge protection proxy (SEPP), the service gateway, and nodes in the 5G service mesh. The SEPP is the network node used to protect control plane traffic that is exchanged between different 5G PLMNs (Public Land Mobile Networks). As such, the SEPP performs message filtering, policing and topology hiding for all API messages.

The service gateway is a node that sits in front of a group of producer NFs that provide a given service. The service gateway may load balance incoming service requests among the producer NF that provide the service in a manner similar to the SCP.

The service mesh is a name for a group of intermediate proxy nodes that enable communications between producer and consumer NFs. The service mesh may include one or more SCPs, SEPPs, and service gateways.

One problem with the existing 3GPP service architecture is that while message priorities and congestion handling are defined at the 3GPP NFs, all nodes between consumer and producer NFs cannot register themselves as 5G NFs, e.g., intermediate proxies, service gateways between sites of same vendor etc. Therefore, consumer NFs can see the load of target producer NFs only. There are no guidelines from 3GPP to define behavior on intermediate nodes. Also, 3GPP does not define overload handling mechanisms at the intermediate proxy nodes, such as the SCP, SEPP, service gateway or service mesh to avoid service starvation for low priority services. For example, if an SCP is handling traffic between producer and consumer NFs, and the producer NFs are not overwhelmed, the traffic may proceed without invoking congestion control procedures at the SCP. However, the sum of the traffic from the consumer NFs to the producer NFs may overwhelm the SCP. Without a mechanism for handling traffic congestion at the SCP or other intermediate proxy node, such nodes may become congested and drop traffic for low priority services.

An additional problem that may occur at an intermediate or producer NF is that consumer NFs may not set 5G message priority values correctly or consistently so that traffic can be treated as desired by the network operator. For example, the 3GPP architecture relies on consumer NFs to set the 5G message priority parameter in the message header, and a consumer NF may experience difficulty in setting the priority parameter to the appropriate value when the same message type is sent to different destination network names (DNNs) or network slices, identified by single network slice selection assistance information (S-NSSAI). Because consumer NFs cannot be counted on to reliable or uniformly set 5G priority parameters, the 5G message priority parameter set by a consumer NF cannot be solely relied upon as a basis for handing messages during overload conditions, because doing so can lead to denial of service for some services.

Accordingly, there exists a need for methods, systems, and computer readable media for rules-based overload control for 5G services.

SUMMARY

A method for rules-based overload control for 5G services includes configuring, at an intermediate or a producer network function (NF), overload message handing rules, wherein at least some of the rules include destination network name (DNN) or a network slice, subscription or location identifying parameter as rule selection criteria. Rules may include any other parameters or attributes defined by 3GPP or vendor. The method further includes associating, at the intermediate or producer NF, a guaranteed processing bandwidth of the intermediate or producer NF, with at least some of the overload message handling rules. The method further includes receiving a first message at the intermediate or producer NF. The method further includes determining, by intermediate or producer NF, that an overload condition exists. The method further includes identifying, by the intermediate or producer NF, that the first message includes parameters that match the rule selection criteria for one of the overload message handling rules. The method further includes determining, by the intermediate or producer NF, that a portion of the guaranteed processing bandwidth of the intermediate or producer NF for the matching overload message handling rule is available to process the first message. The method further includes processing, by the intermediate or producer NF and using a portion of the guaranteed processing bandwidth of the intermediate or producer NF for the matching overload message handling rule, the first message and updating a message count for the overload message handling rule.

According to another aspect of the subject matter described herein, configuring the overload message handling rules includes configuring rules that treat messages of the same service type differently based on the DNN or network slice, subscription, or location identifying parameter or attributes/parameters defined by 3GPP or a vendor.

According to another aspect of the subject matter described herein, configuring the overload message handling rules includes configuring rules that treat messages of the same service type differently based on defined parameters or combination of parameters.

According to another aspect of the subject matter described herein, associating a guaranteed processing bandwidth of the intermediate or producer NF with at least some of the overload message handling rules includes associating at least some of the overload message handling rules with buckets and configuring a message count corresponding to bandwidth guaranteed for each rule with its respective bucket.

According to another aspect of the subject matter described herein, the method for providing rules-based overload control for 5G services includes tracking utilization of the bandwidth guaranteed for each rule by keeping a count of the number of messages matching a rule for each bucket.

According to another aspect of the subject matter described herein, the method for providing rules-based overload control for 5G services includes creating dynamic overload message handling rules using information obtained from response messages and using the dynamic overload message handling rules to ensure that messages relating to a common session are processed by a common processor of the intermediate or producer NF.

According to another aspect of the subject matter described herein, the intermediate or producer NF may comprise a security edge protection proxy (SEPP), a service communications proxy (SCP), or a service mesh node.

According to another aspect of the subject matter described herein, the intermediate or producer NF comprises a producer NF.

According to another aspect of the subject matter described herein, the method for providing rules-based overload control for 5G services includes configuring, at the intermediate or producer NF, a non-guaranteed bandwidth bucket usable for tracking bandwidth of the intermediate or producer NF available to messages that do not match one of the overload message handling rules for which a guaranteed bandwidth of the intermediate or producer NF is configured.

According to another aspect of the subject matter described herein, the method for providing rules-based overload control for 5G services includes receiving a second message at the intermediate or producer NF, determining that the second message does not match one of the overload message handling rules for which a guaranteed bandwidth of the intermediate or producer NF is configured, determining, using the non-guaranteed bandwidth bucket, that non-guaranteed bandwidth is available for the second message, and processing the message using the non-guaranteed bandwidth.

A system for rules-based overload control for 5G services includes an intermediate or producer network function (NF) including at least one processor. The system further includes an overload control configuration interface associated with the intermediate or producer NF for providing for configuring overload message handing rules used by the intermediate or producer NF to govern processing of messages during overload conditions, wherein at least some of the rules include destination network name (DNN) or a network slice, subscription or location identifying parameter or any other parameter as rule selection criteria and for associating a guaranteed bandwidth service associated with at least some of the overload message handling rules. The system further includes an overload controller implemented by the intermediate or producer NF for receiving a first message, determining that an overload condition exists, identifying that the first message includes parameters that match the rule selection criteria for one of the overload message handling rules, determining that a portion of the guaranteed bandwidth for the matching overload message handling rule is available to process the first message, forwarding the first message for further processing by the intermediate or producer NF, and updating a message count for the matching overload message handling rule.

According to another aspect of the subject matter described herein, the overload control configuration interface provides for configuring of rules that treat messages of the same service type differently based on the DNN or the network slice identifying parameter or any other parameter.

According to another aspect of the subject matter described herein, the overload control configuration interface provides for configuring of rules that treat messages of the same service type differently based on attributes/parameters defined by 3GPP or vendor.

According to another aspect of the subject matter described herein, the overload control configuration interface provides for associating at least some of the overload message handling rules with buckets and configuring a message count corresponding to bandwidth guaranteed for each rule with its respective bucket.

According to another aspect of the subject matter described herein, the overload controller tracks utilization of the bandwidth guaranteed for each rule by keeping a count of the number of messages matching a rule for each bucket.

According to another aspect of the subject matter described herein, the overload controller creates dynamic overload message handling rules using information obtained from response messages and using the dynamic overload message handling rules to ensure that messages relating to a common session are processed by a common processor of the intermediate or producer NF.

According to another aspect of the subject matter described herein, the overload control configuration interface provides for configuration of a non-guaranteed bandwidth bucket usable for tracking bandwidth of the intermediate or producer NF available to messages that do not match one of the overload message handling rules for which a guaranteed bandwidth of the intermediate or producer NF is configured.

According to another aspect of the subject matter described herein, the overload controller is configured to receive a second message, determine that the second message does not match one of the overload message handling rules for which a guaranteed bandwidth of the intermediate or producer NF is configured, determine, using the non-guaranteed bandwidth bucket, that non-guaranteed bandwidth is available for processing the second message, and forward the second message for further processing the message using the non-guaranteed bandwidth.

According to another aspect of the subject matter described herein, a non-transitory computer readable medium having stored thereon executable instructions that when executed by a processor of a computer control the computer to perform steps is provided. The steps include configuring, at an intermediate or a producer network function (NF), overload message handing rules, wherein at least some of the rules include destination network name (DNN) or a network slice, subscription or location identifying parameter or attributes/parameters defined by 3GPP or vendor as rule selection criteria. The steps further include associating, at the intermediate or producer NF, a guaranteed processing bandwidth of the intermediate or producer NF, with at least some of the overload message handling rules. The steps further include receiving a first message at the intermediate or producer NF. The steps further include determining, by intermediate or producer NF, an overload condition exists. The steps further include identifying, by the intermediate or producer NF, that the first message includes parameters that match the rule selection criteria for one of the overload message handling rules. The steps further include determining, by the intermediate or producer NF, that a portion of the guaranteed processing bandwidth of the intermediate or producer NF for the matching overload message handling rule is available to process the first message. The steps further include processing, by the intermediate or producer NF and using a portion of the guaranteed processing bandwidth of the intermediate or producer NF for the matching overload message handling rule, the first message and updating a message count for the overload message handling rule.

The subject matter described herein may be implemented in hardware, software, firmware, or any combination thereof. As such, the terms "function" "node" or "module" as used herein refer to hardware, which may also include software and/or firmware components, for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

Figure 1:
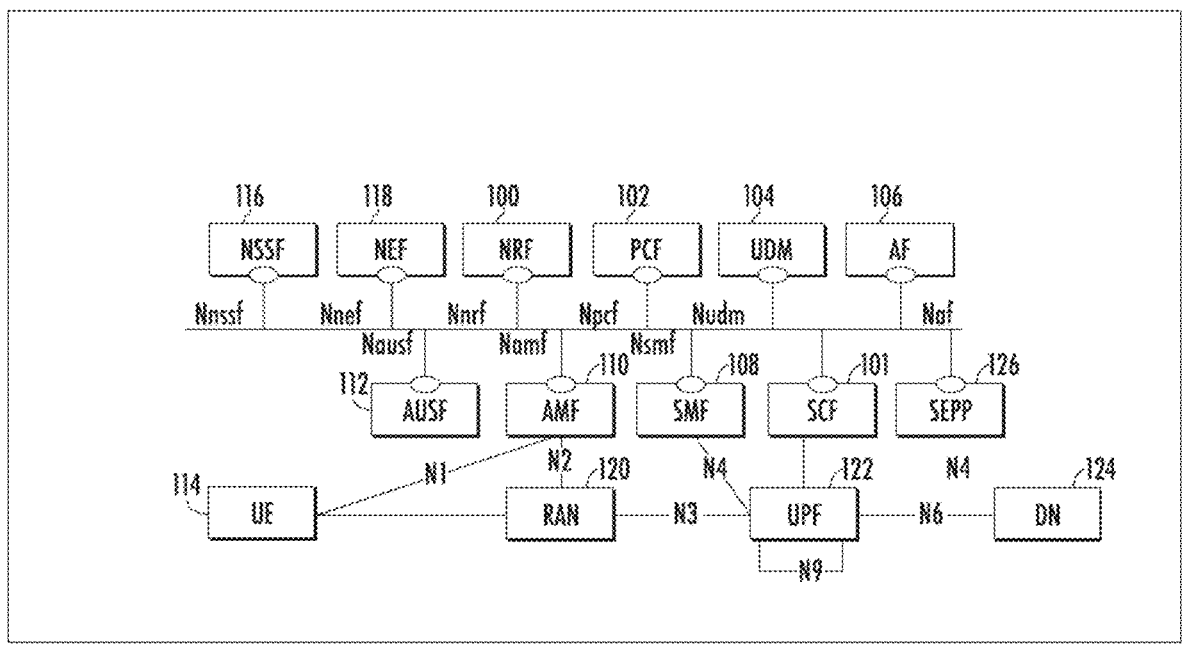
FIG. 1 is a network diagram illustrating an exemplary 5G network architecture.

The subject matter described herein relates to methods, systems, and computer readable media for rules-based overload control for 5G services. FIG. 1 is a block diagram illustrating an exemplary 5G system network architecture.

The architecture in FIG. 1 includes NRF 100 and SCP 101, which may be located in the same home public land mobile network (HPLMN). As described above, NRF 100 may maintain profiles of available producer NF service instances and their supported services and allow consumer NFs or SCPs to subscribe to and be notified of the registration of new/updated producer NF service instances. SCP 101 may also support service discovery and selection of producer NFs. In addition, SCP 101 may perform load balancing of connections between consumer and producer NFs.

NRF 100 is a repository for NF profiles. In order to communicate with a producer NF, a consumer NF or an SCP must obtain the NF profile from NRF 100. The NF profile is a JavaScript object notation (JSON) data structure defined in 3GPP TS 29.510. The NF profile definition includes at least one of a fully qualified domain name (FQDN), an Internet protocol (IP) version 4 (IPv4) address or an IP version 6 (IPv6) address.

In FIG. 1, any of the nodes (other than SCP 101 and NRF 100) can be either consumer NFs or producer NFs, depending on whether they are requesting or providing services. In the illustrated example, the nodes include a policy control function (PCF) 102 that performs policy related operations in a network, a user data management (UDM) function 104 that manages user data, and an application function (AF) 106 that provides application services. The nodes illustrated in FIG. 1 further include a session management function (SMF) 108 that manages sessions between access and mobility management function (AMF) 110 and PCF 102. AMF 110 performs mobility management operations similar to those performed by a mobility management entity (MME) in 4G networks. An authentication server function (AUSF) 112 performs authentication services for user equipment (UEs), such as UE 114, seeking access to the network.

A network slice selection function (NSSF) 116 provides network slicing services for devices seeking to access specific network capabilities and characteristics associated with a network slice. A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects UE 114 to the network via a wireless link. Radio access network 120 may be accessed using a g-Node B (gNB) (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

SEPP 126 filters incoming traffic from another PLMN and performs topology hiding for traffic exiting the home PLMN. SEPP 126 may communicate with an SEPP in a foreign PLMN which manages security for the foreign PLMN. Thus, traffic between NFs in different PLMNs may traverse two SEPP functions, one for the home PLMN and the other for the foreign PLMN. As indicated above, the SEPP is an example of an intermediate proxy node that may become overwhelmed if appropriate congestion control and/or bandwidth reservation procedures are not implemented at the intermediate proxy node.

Guaranteed Traffic Bandwidth for Message Matching Overload Message Handling Rules In the 5G deployment architecture, 3GPP releases 15 and 16 recommend proxy nodes, such as the SCP or SEPP, that sit between client/consumer NFs and server/producer NFs. Proxy nodes, such as the SCP, provide transport and routing functionality between N consumer NFs and M producer NFs, where N and M are integers. Similarly, a network operator may deploy its own service mesh/intermediate gateway/controller nodes between 5G NFs. Service mesh/intermediate gateway/proxy nodes help to perform most common activities among various services, e.g., monitoring, overload control, traffic management, service discovery, etc. In 5G, each producer NF can publish its load level to the NRF. Consumer NFs can subscribe for such changes and be reactive to adjust their traffic rates.

One problem with the existing 3GPP network architecture is that not all nodes between consumer and producer NFs can register themselves as a 5G NF. These nodes that cannot register include intermediate proxies, service gateways between sites of the same vendor, etc. Because intermediate proxy nodes cannot register with the NRF as a 5G NF, consumer nodes may not be aware of the load on the intermediate proxy nodes and may overwhelm the intermediate proxy nodes. Similarly, the NRF provides notifications to service consumers that allows consumers to see the load of target producer nodes. However, because intermediate proxy nodes cannot register as service producers, there are no guidelines from 3GPP to define behavior on an intermediate proxy node for responding to or issuance of such notifications.

Even if an operator plans the capacity of its intermediate proxy nodes, a signaling storm from rogue services/NFs, can overload intermediate network/node/route. Thus, with the service mesh (or intermediate proxy, such as the SCP/SEPP), there is need to set up policies that ensure guaranteed traffic bandwidth for a given NF service messaging. The subject matter described herein includes enhancements in service mesh/SCP/SEPP/intermediate gateways, etc., for guaranteed severability of multiple services during congestion/overload conditions of intermediate proxy nodes. The subject matter described herein also includes enhancements in producer NFs that provide for rules-based overload control by the producer NFs. Thus, in the description below, the term "intermediate or producer NF" will be used to refer to an intermediate node, such as an SCP, SEPP, or service mesh, or a producer NF at which rules-based overload control as described herein is implemented.

Regardless of a shared or dedicated network, intermediate proxy nodes need a way to ensure guaranteed serviceability for message matching operator-specified overload message handling rules. Without guaranteed serviceability, messaging between two nodes can over-run the capacity of service mesh/intermediate proxy nodes and thus may impact functioning of the intermediate proxy nodes, as well as other services.

Figure 2:
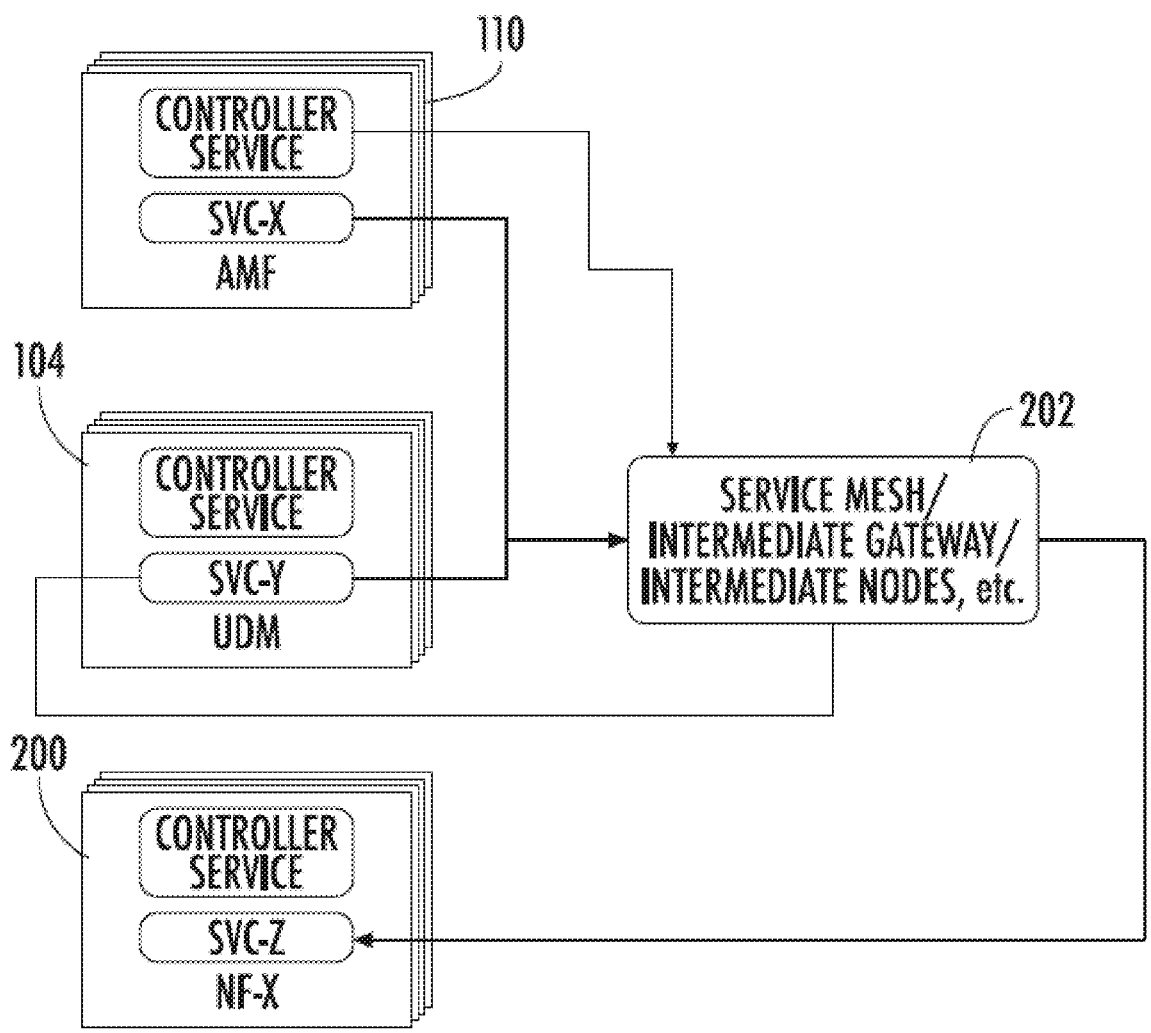
FIG. 2 is a diagram illustrating 5G network functions connected via intermediate proxy nodes, such as a service mesh.

FIG. 2 illustrates how traffic between end nodes can overwhelm an intermediate NF, such as a service mesh. In FIG. 2, an AMF 110 is connected to a UDM 104 and another NF 200 via a service mesh 202. AMF 200 provides a service Svc-x. UDM 104 provides a service Svc-Y. NF 200 provides service Svc-Z. Messaging between Svc-X and Svc-Y may exhaust the capacity of intermediate proxy node 202 (during a data storm or other such scenario). As a result, Svc-X->Svc-Z and Svc-Y->Svc-Z servicing may be adversely impacted.

5G does not provide guidance on message priority to be used for a message within a given service. As per 3GPP TS 29.500, all messages without priority defined by clients, shall have default priority of 24. Also, it is extremely difficult for vendors/operators to drive/assign a priority for each service message, which can fairly justify the priority compared to other services of other NFs.

At the same time, to ensure stability of intermediate proxy nodes during data storm/overload conditions, operators set up a throttling policy to reject low priority messages, when system capacity is beyond a certain point.

The following are examples of policies that may be implemented at an intermediate proxy node when system capacity is beyond a certain point.

I. When utilization of system compute resources crosses 60%, reject all messages with priority >=15

II. When utilization of system computing resources crosses 80%, reject all messages with priority >=7

While such policies may be useful, they fail to take into account what happens to the service with low priority messages/traffic during congestion events.

Another problem that occurs when all lower priority messages are rejected in a congestion situation is that if all messages of a given service are of lower priority, then priority-based thresholds may starve a given service. For example, in FIG. 2, if all messages of the service Svc-Z have the default priority and the intermediate proxy node goes into overload, all messages for service Svc-Z will be rejected, preventing service Svc-Z from being provided in the network.

In 5G deployments, there is the possibility of many-to-many mapping between NFs (network functions) and services, i.e., a given NF may provide multiple services, and a service may be provided by multiple NF instances.

Figure 3:
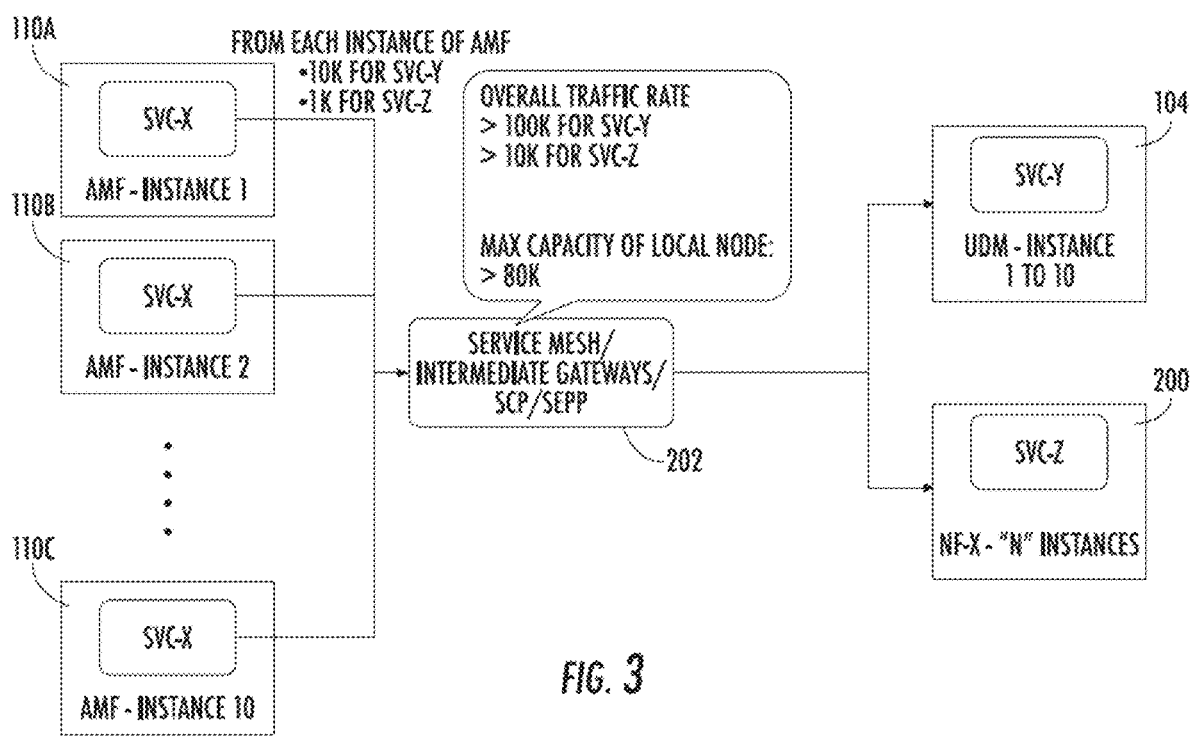
FIG. 3 is a network diagram illustrating potential congestion that can occur at an intermediate proxy node between 5G network functions.

FIG. 3 is a network diagram illustrating an example where multiple producer NFs provide services to multiple consumer NFs. In the illustrated example, the consumer NFs or AMFs 110a through 110c. The producer NFs are UDM 104 and NF instance 200. The producer and consumer NFs are connected via intermediate proxy node 202. In one example, it can be assumed that there are 10 AMF instances and 10 UDM instances running. Each UDM instance may be capable of handling 10 kilobits per second of traffic. However, the multiple AMF instances running service Svc-X may flood intermediate proxy node 202 with messaging towards service Svc-Y provided or hosted by each instance of UDM 104. In addition, intermediate proxy node 202 may need a policy to ensure that messaging for service Svc-Z can be provided by rejecting messages relating to Svc-X and Svc-Y. The messages for service Svc-Z may have any priority, but there should not be a complete denial of service for service Svc-Z, even though service Svc-Z messages have lower priority than the messaging relating to other services.

In a 5G deployment, HTTP connections are on-demand. Thus, it is possible that Svc-X of AMF-instance 1 can instantiate multiple connections with the intermediate proxy node, to distribute the traffic on multiple connections. For example, there may be 10 connections between SVC-X of AMF-instance 1 and SCP/SEPP node. Thus, overall traffic originated by a given Svc-X instance (10K for Svc-Y and 1K for Svc-Z), will spread across 10 connections, i.e., each connection handles 1.1K only.

Thus, performing ingress control based on a source service or per connection basis is not a viable option for a network that implements a service mesh since there are multiple and even on-demand connections for ingress traffic of a service.

Similarly, the intermediate proxy node may have 10 connections with each instance of a UDM and may be connected to 10 different instances of a UDM. Thus, performing egress control based on a target node or per connection basis, is not a viable option for a service mesh or intermediate NFs.

In addition to problems at the intermediate proxy nodes, producer NFs and services implemented by producer NFs can cause consumer NFs to experience denial of service during overload events if the messaging and/or the producer NFs are not configured appropriately to provide guaranteed bandwidth for messages matching overload message handling rules. In general, during an overload event, to ensure node stability and functional processing, there will be discard policy to drop messages based on local policy of node. Generally the discard policy is based on message priority, e.g., when the load level is Y, then the discard messages with priority <X. The idea is based on the fact that consumer or originator has selected the correct or appropriate message priority when sending message to the producer or end application.

For the 5G architecture, 3GPP TS 29.500 describes a 3gpp-Sbi-Message-Priority header that carries 5G service message priority. According to TS 29.500, 0 is the highest priority. However the setting of the value of the 3gpp-Sbi-Message-Priority parameter is left as an implementation detail for the consumer NF.

The following use cases in the 5G network make it very difficult (if not impossible) to set up a discard policy solely based on message priority. For example, when the same type of service based interface (SBI) message contains information regarding different DNNs, network slices, subscription permanent identifiers (SUPIs), location, etc. (and this list is long with additional models being enabled for a vertical application layer, i.e., service enabled architecture layer (SEAL) or vehicle-to-everything (V2X) support for 5G). Since different DNNs, slices, etc., have different use-cases to solve, to protect messages related to a given use case, the consumer NF must use different message priority to ensure QoS. Therefore, the consumer NF cannot use a flat policy to assign priority "X" to all similar message types on a given service interface.

For example, when an SMF sends an SmPolicy create context message to a PCF (see 3GPP TS 29.512), the Sm Policy create context message contains a DNN and an S-NSSAI. When an SMF instance handles messages for different DNNs or S-NSSAIs, it is challenging for the SMF to decide message priority that should be assigned to a given SmPolicy create context. Thus, it is complex to enable such fine grained policy at consumer NFs to set the right priority for a given service message.

Even if operators solve the problem by creating such policy, it is very unlikely that all consumer NFs uniformly support the corresponding implementation. Intermediate (e.g. SCP/SEPP) and producer NFs may serve dedicated or shared set of DNNs, network slices, SUPIs, etc. Thus, rejection of messages during overload conditions based on priority may lead to denial-of-service. Even if a consumer NF enables a complex policy to set the appropriate priority, when an intermediate or producer NF discards messages based on priority, the discarding of messages based on priority may trigger a condition that leads to denial of service for a certain set of DNNs/network-slices/SUPIs, etc.

Denial of service attacks can lead to serious consequences for the network operator. For example, when a PCF is overloaded, the operator may not want to shut down 100% of the traffic for a given DNN/network slice etc. The operator cannot expect consumer NF to have the correct message priority populated to avoid denial of service. Thus, there is a need for custom policies to be configured on a given node that provide guaranteed processing of messages matching traffic rules, even during an overload condition. Since the problem is generic for all intermediate and producer NF nodes, the solution described herein can be applied on all intermediate nodes (e.g. SCP/SEPP) and producer NFs (3GPP-defined or non-3GPP-defined), to ensure guaranteed service at a given node, even when the node is in an overload condition.

Figure 4:
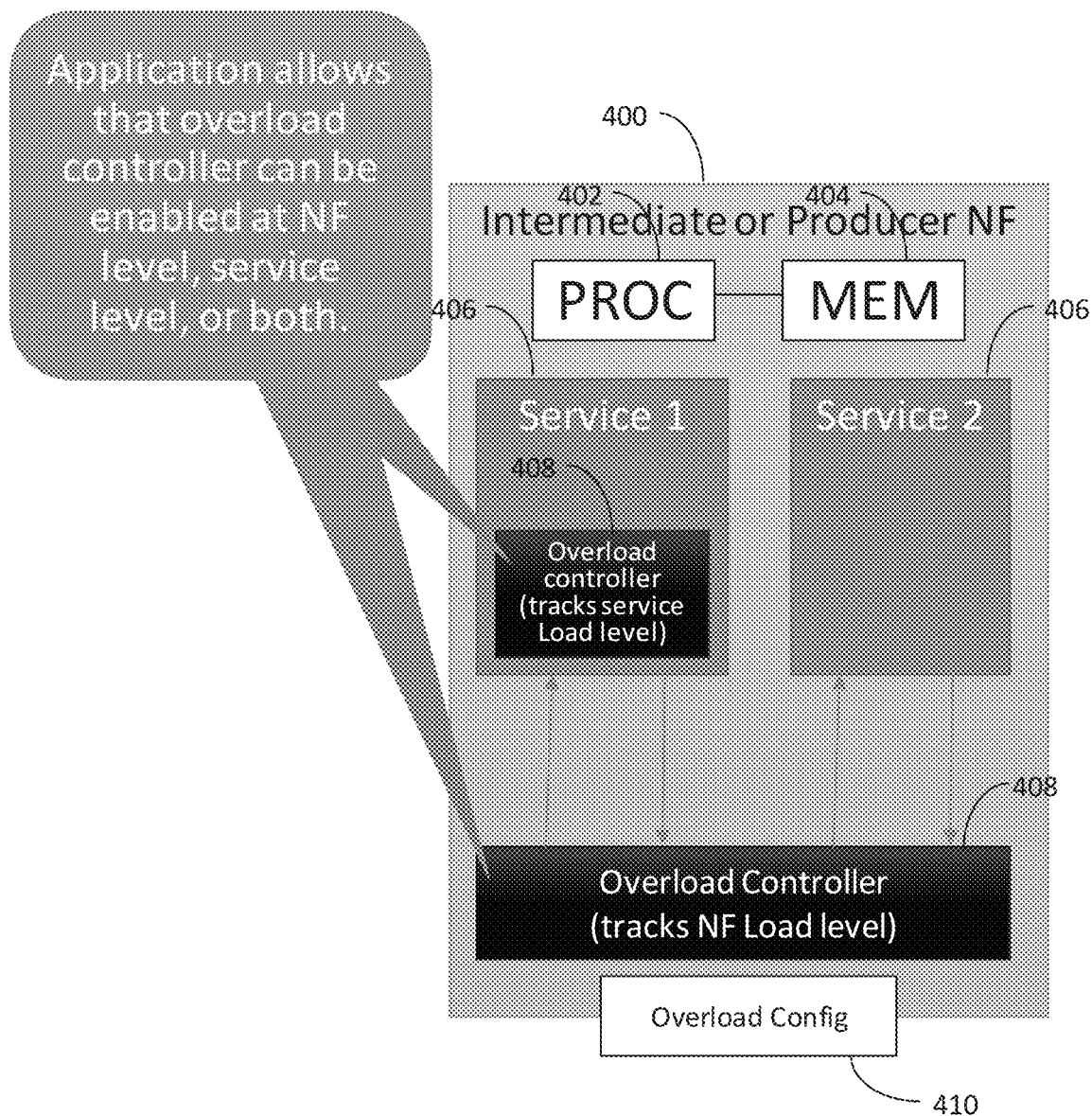
FIG. 4 is a block diagram illustrating a network function implementing 5G rules-based overload control.

The subject matter described herein includes an overload controller that tracks the load level at an intermediate or producer NF and applies rules-based overload control where overload message handling rules are used to identify guaranteed bandwidth for messages whose parameters match specific rules. FIG. 4 illustrates and example of an NF, which may be an intermediate NF or a producer NF that includes an overload controller that provides guaranteed bandwidth for messages matching overload handling rules. Referring to FIG. 4, NF 400 includes at least one processor 402 and a memory 404. NF 400 also includes one or more service instances 406 that provide 3GPP or non-3GPP defined services. For example, service instances 406 may provide any of the 3GPP-defined services illustrated in FIG. 1 or a non-3GPP defined service that is not illustrated in FIG. 1. NF 400 also includes overload controllers 408 implemented at the service level and/or at the NF or node level for providing guaranteed bandwidth for messages matching overload message handling rules. NF 400 further includes an overload control configuration interface 410 that provides for configuring overload message handing rules used by the intermediate or producer NF to govern processing of messages during overload conditions. At least some of the rules include destination network name (DNN) or a network slice, subscription, or location identifying parameter as rule selection criteria. Overload control configuration interface 410 may also provide for associating a guaranteed bandwidth service with at least some of the overload message handling rules.

The above-referenced parent application describes a solution that provides guaranteed traffic serving for a given service. This applies for 5G as well as non-5G traffic. Solution details of that application can be applied to solve guaranteed servicing based on not only service name but also any 5G-defined parameter such as DNN, network slice, SUPI range, etc.

Any suitable mechanism may be used to detect an overload condition at an intermediate or producer NF. For example, the overload detection algorithm may consider nodal CPU utilization, nodal memory utilization, ingress traffic rate, etc. The subject matter described herein includes defining policies to select message(s) that shall be allowed/rejected during overload control. The solution can be applied at 5G NFs, such as the PCF, NRF, SCP, SEPP, or at a non-3GPP-defined NF. The solution enables any operator to define custom policies to provide guaranteed servicing on a given node, even during overload condition. This helps operator to support serviceability of different customer types, network locations, and other factors. Examples of types of customers and other factors that can receive guaranteed bandwidth support in overload conditions include:

Premium customers,
Emergency calls,
Specific DNNs,
Specific network slices,
etc.

Overall, the use cases enabled by the subject matter described herein to handle various traffic patterns (even during nodal overload/congestion) are limitless and of high value to network operators.

Figure 5:
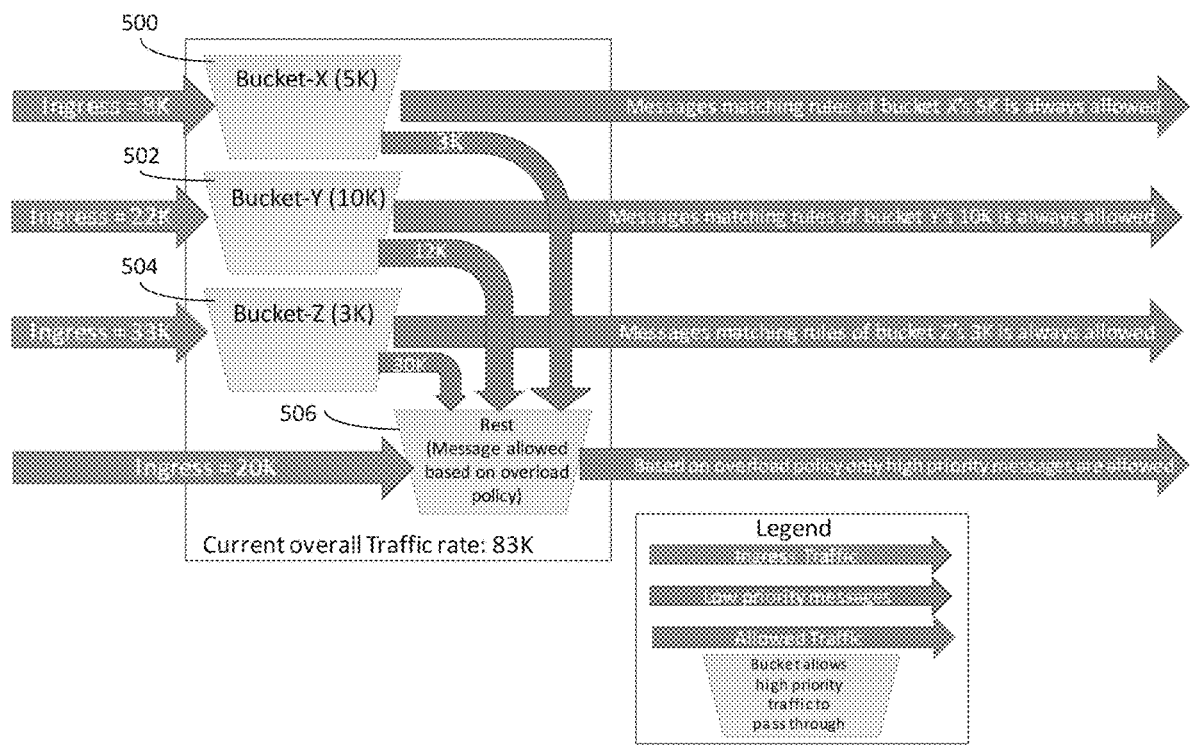
FIG. 5 is diagram illustrating exemplary data structures for implementing 5G rules-based overload control.

FIG. 5 illustrates an example of message handling that may be performed by overload controller 408. Referring to FIG. 5, on a given node (intermediate or producer NF), the following configuration may be performed via overload control configuration interface 410 illustrated in FIG. 4:

Create a bucket, e.g., bucket X.
Attach a bucket size to the bucket, e.g. 5K (bucket size indicates the number of messages matching a given rule that will be guaranteed to be processed)
Create rule(s) for which guaranteed service support is required, e.g.: method=post,service=npcf-smpolicy-control, dnn="device.abc.com"
Associate a rule with the bucket.
Apply guaranteed service handling as described below and in the parent application.

In FIG. 5, buckets 500, 502, and 504 are respectively associated with overflow message handling rules X, Y, and Z. Each bucket 500, 502, and 504 is configured with a message processing capacity (bucket size) that indicates the number of messages matching the rule that the node or service is guaranteed to pass during an overload condition. In the illustrated example, bucket 500 is configured with a capacity of 5000 messages, bucket 502 is configured with a capacity of 10,000 messages, and bucket 504 is configured with a message processing capacity of 3000 messages. An overflow bucket 506 is used to handle the processing of messages from buckets 500, 502, and 504 when processing the message would exceed the processing capacity of one of buckets 500, 502, and 504. Messages whose processing is governed by bucket 506 may be processed based on an overload policy. For example, the overload policy indicates that only high priority messages will be passed, a message whose processing is governed by bucket 506 may be either processed or dropped based on the priority of the message.

In one of the processing examples illustrated in FIG. 5, 8000 ingress messages matching rule X for bucket 500 arrive at the node. Bucket 500 is configured to provide guaranteed processing bandwidth for 5000 of the messages. Accordingly, 3000 of the messages matching the rule for bucket 500 will be processed using the rules for overflow bucket 506. Similar processing and overflow are performed buckets 502 and 504 where each bucket provides guaranteed message processing bandwidth for messages up to the message processing amount configured for each bucket. Messages exceeding the configured processing amount for each bucket are processed using the rules defined for overflow bucket 506.

Example Overflow Message Handling Rules

Based on type of node for which this solution is being applied/enabled, the network operator can configure, using overload control configuration interface 410, overload message handling rules used by overload controller 408. For example, when overload control scope is SCP/SEPP (where messages of almost all 5G inter-NF communication pass through), operator may configure rules matching for any producer NF to which the SCP/SEPP is allowed to forward the messages. Two examples of rules that may be configured for access by overload controller 408 are as follows:

method=post, service=npcf-smpolicycontrol, dnn="device.abc.com"
method=post, service=nudm-sdm, supirange={A-B}

Above mentioned rules are being posted to a rules database accessible by overload controller 408. In the first rule example, the "method=post" part of the rule definition defines the type of method to which the rule applies. The "service=nfcp-smpolicycontrol" part of the rule definition defines the type of service to which the rule applies, which in this case is session management policy control destined for a PCF. The third part of the rule definition, "dnn=device.abc.com" specifies a service-independent parameter so that the rule is specific to a particular destination network name, which in this example is device.abc.com. In the second rule example, the service part of the rule definition identifies the rule as application to user data management or subscriber data management service. The service independent scope part of the rule defines a SUPI range for the rule definitions, which makes the rule applicable to define guaranteed bandwidth service during overload for messages that have the particular SUPI range but not all messages of the same service type.

When overload control scope is a given producer NF, then rules can be limited to set of services provided by that producer NF, e.g., for a PCF NF instance, the network operator may configure rules matching a set of services supported by that PCF NF instance. The following two rule definitions can be used to provide guaranteed bandwidth at the producer NF level for messages that match the rule parameters:

method=post, service=npcf-smpolicycontrol, dnn="device.abc.com"
method=post, service=npcf-am-policy-control, supi="imsi-1234567890"

When overload control scope is a producer NF service instance, then rules can be limited to that specific service only, e.g., for PCF Smpolicy service. The following rule definition can be used to provide guaranteed bandwidth for messages at the NF service instance level:

method=post, service=npcf-am-policy-control, supi="imsi-1234567890"

As described in the parent application, guaranteed bandwidth service is provided using buckets, which are data structures used to count the number of messages matching a given rule and that have bucket sizes that are sized corresponding to the guaranteed bandwidth represented by each bucket. When configuring a rule, the solution described herein also allows the network operator to specify if subsequent messages of matching rule shall automatically be processed using the same bucket and corresponding processor as an initial matching message. For example, for the following rule, subsequent messages for GET/PUT/PATCH/DELETE shall automatically be associated with the corresponding bucket and processor (with which the initial message was associated):

method=post, service=npcf-smpolicycontrol, dnn="device.abc.com"

To enable support of guaranteed servicing support of subsequent messages as well, overload controller 408 obtain information about the created resource from the initial message. The 5G service architecture mandates that the producer NF shall specify the created resource reference in the Location Header of the response messages. Overload controller 408 uses the identification of the created resource from the location header of the response message, to create a dynamic rule and attach it to the bucket with which the initial message was associated. For subsequent messages, dynamic rules ensure that messages relating to a common session are processed by the same processor of the intermediate or producer NF. Overload controller 408 can be extended to use the identification of the created resource from the response body, to create a dynamic rule and attach it to the bucket with which the initial message was associated.

Such dynamic rules need to be deleted when a consumer NF deletion of the corresponding resource (created by initial messages that have guaranteed traffic bandwidth configured) from an intermediate or producer NF. The network operator still has the option to configure static rules for initial as well as subsequent messages. Configuring static rules eliminates the need for overload controller 408 to manage dynamic rules.

Tables 1 and 2 below illustrate examples of static and dynamic rules that may be configured in an intermediate or producer NF.

TABLE 1

Static Rules Configured for Guaranteed Bandwidth

| Configured Criteria | Subsequent Messages? | Bucket |
|---|---|---|
| method = post, service = npcf-smpolicycontrol, dnn = "device.abc.com" | Y | X |
| method = post, FQDN: pcfnotification.fqdn.com, URI: /abc/test | N | Y |
| method = post, service = npcf-smpolicycontrol, sliceInfo = "sst-29" | Y | Z |

TABLE 2

Dynamic Rules Configured for Messages Matching Static Rules

| Dynamic Criteria | Bucket |
|---|---|
| FQDN: producerFQDN.com, URI: "/abc/def" | X |
| FQDN: producerFQDN.com, URI: "/test/check" | X |
| FQDN: producerFQDN.com, URI: "/ssn/check1" | Z |

In Table 1, each rule is associated with one of buckets 500, 502, and 504. Each rule is also marked as to whether dynamic rule generation for handling subsequent messages is configured or not. Table 2 illustrates dynamic rules generated for subsequent messages matching the corresponding static rules in Table 1. For example, the first dynamic rule in Table 2 contains the fully qualified domain name of the producer NF that responded to the initial message matching the first rule in Table 1.

Functional Processing Flow

The following steps may be used to configure and use an intermediate or producer NF to provide rules-based overload control.

1. The network operator defines bucket(s), rule(s) and creates associations between the buckets and the rules.
   The operator also configures, for each rule, whether subsequent messages of that rule will be automatically processed using the same bucket by overload controller 408.
   This information is stored in a persistent database.
2. When a message is received by a node, checks message parameters against configured static rules as well as dynamic rules and determines if the message matches the processing rule for any of the buckets.
   Dynamic rules will be added in step 4.
   Run the overload control procedure as described herein (process the message using the bandwidth guaranteed for the matching rule if available or process the messages using rules defined for the overflow bucket).
3. If the message is allowed to be processed and a matching rule was found in the previous step, then check if subsequent message handling for that rule needs to be tracked.
   If subsequent message handling needs to be tracked, then store a reference to the bucket index along with the HTTP request context and forward the message to the service instance that processes messages to provide the given service.
4. Since response messages travel through the reverse path as initial messages, the overload controller will see the response messages as well.
   If context of a request indicates that subsequent message processing needs to be handled (as marked in step 3), then create a dynamic rule as follows:
   URI: URI for the created resource, bucket: bucketId
   If the request message is for DELETE resource, then remove the rule from dynamic table.

Table 3 shown below illustrates an example of guaranteed traffic bandwidth rates for traffic matching different overload message handling rules that may be implemented by an intermediate or producer NF. The rates in Table 3 correspond to the relative bucket capacities assigned to the buckets illustrated in FIG. 5.

TABLE 3

Guaranteed Bandwidth Rates for Different Rules

| | Rule-X | Rule-Y | Rule-Z |
|---|---|---|---|
| Guaranteed bandwidth rate (Configurable reserved capacity) | 5% | 10% | 3% |

In Table 3, each of rules Rule-X, Rule-Y, and Rule-Z has a guaranteed bandwidth service rate which is a percentage of reserved capacity of the intermediate or producer NF. For each rule, the percentage of the reserved capacity of the intermediate or producer NF that will be used exclusively by messages matching a given rule when the intermediate or producer NF is in an overload state, even if the messages of a matching a given rule are of lower priority than messages of other services that are rejected by the intermediate proxy node. For example, if a message for Rule-X is with a priority of 10 is received at an intermediate proxy node, the message for Rule-X may be processed under the guaranteed bandwidth of Rule-X and another non-guaranteed message with a higher priority (higher priority means lower numeric priority value according to 3GPP) may be rejected by the intermediate or producer NF. In Table 3, messages matching Rule X are guaranteed 5% of the reserved capacity of the intermediate or producer NF, messages matching Rule Y are guaranteed 10% of the reserved capacity of the intermediate or producer NF, and messages matching Rule Z are guaranteed 3% of the reserved capacity of the intermediate or producer NF.

In this model, the network operator configures the following:
1. Overall capacity of intermediate or producer NF.
   e.g., overall capacity of the intermediate or producer NF is 100K.

2. Guaranteed bandwidth for each rule
    e.g., If the overall capacity of the intermediate or producer NF 100K, then guaranteed bandwidth or GTB (based on Table 3) will be as follows:
    Rule-X: 5K
    Rule-Y: 10K
    Rule-Z: 3K Thus, regardless of message priority across multiple service message types (passing through the intermediate proxy node or processed by the producer NF), messages matching each rule (with configured guaranteed bandwidth service) will have ensured/guaranteed allocated capacity on the intermediate or producer NF.

Message Processing Details:

The following are functional details that may be implemented by an intermediate proxy node, such as an SCP, SEPP, service mesh, or producer NF that provides guaranteed traffic bandwidth for messages matching specific overload message handling rules.

1. Check the overload state of the intermediate or producer NF. If the intermediate or producer NF is not in an overload condition, then no further check is required. Messages should be allowed to pass through or be processed by the intermediate or producer NF as part of non-guaranteed bandwidth. This is the case to handle normal functioning of the intermediate or producer NF (during non-overload scenarios)
2. If the intermediate or producer NF is in an overload condition, check if the received message matches one of the overload message handling rules.
    a. If the message matches one of the overload message handling rules, and there is still bandwidth available, then forward the message to the service instance for processing (regardless of message priority).
        Only messages that do not match one of the overload message handling rules will be throttled based on priority.
    b. If overload message handling rules and corresponding buckets are configured and there is no bandwidth available for a given message matching one of the rules, then do the following:
        i. If there are lower priority (i.e., lower than the priority of the current message) messages in the matching bucket, then allow that message from the guaranteed bandwidth for the bucket. The matching bucket provides for fine-grained logic to allow higher priority messages among other messages for the matching the rule.
            E.g. for messages matching a given rule, P5 might be the highest priority message among all messages for that rule. Thus, during overload, P5 messages for the rule must be allowed (up to the configured bandwidth for the messages matching the rule, even when the overload policy might be rejecting P3 messages of messages matching other rules.)
        ii. If there are no lower or same priority messages in the bucket, then the message treatment procedure is same as for services with no rule configured. (see details in step c)
    c. If there are no overload message handling rules configured, then run the message through the non-guaranteed bandwidth bucket. Thus, a message will be allowed/rejected based on the overload policy of the system (Overload policy accepts/rejects messages based on message priority and system overload level).
        i. If the overload policy allows message to pass through, then the message will be processed.
        ii. Otherwise, the message will be rejected.

With this approach, messages with parameters matching overload control rules will have guaranteed message processing bandwidth up to a configured amount. This holds true even during data storms or other anomalies in the network.

Some message processing rules can be categorized and identified using PATH/URI specified by 3GPP in corresponding Network Function specifications. Other rules, as indicated above, may require network slice and DNN identifying parameters for the priority to be configured correctly. This approach can also be applied to non-5G messages based on PATH/URI and other custom attributes in request header or body. Thus, a network operator should be able to configure guaranteed traffic bandwidth for any rule matching type of traffic passes through respective node. This approach can also be applied to provide guaranteed traffic bandwidth to a given producer as well (based on FQDN, network slice identifiers, DNNs, etc.). This helps in use-cases of managing emergency services and other premium customers. For messages with no priority assigned, the operator can specify a default message priority. (As per 3GPP TS 29.500, all 5G core (5GC) messages without priority defined by clients, shall have default priority of 24). Alternatively, network operators can determine relative message priorities based on network slice and/or DNN identifying parameters.

An intermediate or producer NF that implements guaranteed bandwidth using overload message handling rules may also implement the following types of tracking/monitoring to enforce the guaranteed bandwidth:

For messages with configured overload message handling rules, track the message rate of a given priority processed under each matching rule;

Track overall message rate and compare to overall traffic capacity of the intermediate or producer NF; and Track non-guaranteed bandwidth message rate for individual priority messages.

Table 4 shown below illustrates an example of message rates that may be tracked at an intermediate or producer NF that implements guaranteed traffic bandwidth for messages matching overload message handling rules.

TABLE 4

Message Rates Tracked by Intermediate or Producer NF

| Rule | Guaranteed Bandwidth Quota | Traffic Rate | Guaranteed Traffic Rate Per Priority | |
|---|---|---|---|---|
| | | | Message Priority | Current rate |
| Rule-X | 5K | 2K | P0 | 1K |
| | | | P5 | 1K |
| Rule-Y | 10K | 10K | P0 | 7K |
| | | | P1 | 2K |
| | | | P5 | 1K |
| Rule-Z | 3K | 1K | P0 | 1K |

In Table 4 it can be seen that the traffic rate for each of rules Rule-X, Rule-Y, and Rule-Z is tracked. In addition, rates for each allowed message priority within a given rule are also tracked. For example, for Rule-X, message rates for priority P0 and P5 are tracked. It represents that 1K traffic rate of P0 and P5 priority messages are allowed through Rule-X bucket. It should be noted that rules that are not defined as having guaranteed bandwidth will not have a configured guaranteed bandwidth rate.

As stated above, in addition to tracking message rates of messages with guaranteed bandwidth service, an intermediate proxy node may also track message rates based on priority for non-guaranteed bandwidth traffic. Table 5 shown below illustrates example non-guaranteed bandwidth traffic that may be tracked by an intermediate or producer NF.

TABLE 5

Tracked message rates based on priority for
non-guaranteed bandwidth traffic
Non-Guaranteed bandwidth traffic based on priority

| Priority | Rate |
|---|---|
| P0 | 5K |
| P1 | 5K |
| P3 | 10K |
| P6 | 15K |
| P15 | 11K |
| P18 | 24K |

In Table 5 message rates for non-guaranteed bandwidth traffic are tracked for every allowed message priority.

Another metric that may be tracked by an intermediate or producer NF node that implements guaranteed traffic bandwidth service is the total message rate of non-guaranteed bandwidth and guaranteed bandwidth traffic. Table 6 shown below illustrates the total message rate that may be tracked by such an intermediate or producer NF node.

TABLE 6

Total Traffic Rate of Non-Guaranteed
Bandwidth and Guaranteed Bandwidth
Current Traffic rate (guaranteed bandwidth +
non-guaranteed bandwidth)

| 83K |
|---|

Table 6 illustrates the sum of all the traffic rates in Table 4 and Table 5, which is the total rate of traffic that is currently being handled by the intermediate or producer NF node. Such a rate may be compared to the overall message capacity of the node to determine whether the node is in an overloaded state. For example, the network operator may configure the overload triggering state of the node to be 80% of total capacity. If the node is capable of handling 100 k messages per second and the engineered overload threshold is defined at 80 k , then the rate of 83 k in Table 6 would indicate that the node is in an overloaded state and trigger guaranteed traffic bandwidth service as described herein.

For a simplified explanation of the guaranteed bandwidth service, the following examples in Table 7 assume that overload policy rejects messages at 100% nodal capacity. However, the rejection of messages from the non-guaranteed bandwidth bucket can be applied using an overload policy with multiple throttle levels and message priority mappings (where messages up to a certain priority level will be rejected at a certain system overload level).

TABLE 7

Scenario and Message Handling in Overload State

| # | Case (Each scenario is based on Tables 3-6) | Node behavior | Action |
|---|---|---|---|
| 1. | Message with priority 4 is received for Rule-A | There is no guaranteed quota for Rule-A. Since low priority messages are in process for the non-guaranteed bandwidth bucket, thus allow the message for processing. | Capture/update non-guaranteed bandwidth traffic rate for P4. If required, lower/same priority messages will be rejected from non-guaranteed bandwidth. |
| 2. | Message with priority 18 is received for Rule-A | There is no guaranteed quota for Rule-A. Also, no lower priority messages are in process for the non-guaranteed bandwidth bucket, thus the message for Rule-A will be processed if the system's overload policy allows the message. Overall traffic rate is less than 100%, allow the message for processing. | Capture/update non-guaranteed bandwidth traffic rate for P18. If required, Low/same priority messages will be rejected from non-guaranteed bandwidth |
| 3. | Assume system is running at 100% capacity. Message with priority 18 is received for Rule-A | There is no guaranteed quota for Rule-A. The message for the non-guaranteed bandwidth bucket will be processed, if the system's overload policy allows the message No lower priority messages are in process for the non-guaranteed bandwidth bucket, thus, the message for Rule-A | Message rejected |

TABLE 7-continued

Scenario and Message Handling in Overload State

| # | Case (Each scenario is based on Tables 3-6) | Node behavior | Action |
|---|---|---|---|
| | | will be processed if the system has any computing resources available. Since no buffer space exists to store the message, reject the message. | |
| 4. | Message with priority 20 is received for Rule-X | Rule-X has quota available in its guaranteed rate bucket for Rule-X. Allow the message to the processing destination for Rule-X | Capture/update Rule-X guaranteed bandwidth traffic rate for P20. |
| 5. | Assume system is running at 100% capacity. Message with priority 20 is received for Rule-X | Rule-X has quota available in its guaranteed rate. Allow the message to the processing destination for Rule-X | Capture/update Rule-X guaranteed bandwidth traffic rate for P20. The system will reject messages in the non-guaranteed bandwidth bucket. In non-guaranteed bucket, even the highest priority message can be rejected to ensure system nodal capacity is not exceeded. |
| 6. | Message with priority 4 is received for Rule-Y | Rule-Y guaranteed capacity is exhausted. However, there are lower priority (lower than 4) messages being processed in corresponding guaranteed traffic bandwidth bucket. Message is allowed from the guaranteed traffic bandwidth bucket. | Capture/update Rule-Y guaranteed bandwidth traffic rate for P4. (Lower/same priority messages of Rule-Y will be processed under non-guaranteed traffic bandwidth. If required, those messages will be rejected.) |
| 7. | Message with priority 6 is received for Rule-Y | Rule-Y guaranteed capacity is exhausted. Also there are no lower priority messages in the guaranteed traffic bandwidth bucket of Rule-Y. Thus, the message will be processed from non-guaranteed traffic bandwidth bucket. The message for the non-guaranteed traffic bandwidth bucket will be processed if system's overload policy allows the message. If overall traffic rate is less than 100% capacity, message will be allowed for processing. | Capture/update non-guaranteed traffic bandwidth traffic rate for P6. Lower/same priority messages of Rule-Y will be processed under non-guaranteed traffic bandwidth when the guaranteed traffic bandwidth bucket is exhausted. |
| 8. | Assume system is running at 100% capacity. Message with priority 6 is received for Rule-Y | Rule-Y guaranteed capacity is exhausted. Also there are no lower priority messages in the guaranteed traffic bandwidth bucket of Rule-Y. Thus, the message will be processed from the non- | Capture/update non-guaranteed bandwidth traffic rate for P6. (Low/same priority messages will be rejected first.) |

TABLE 7-continued

Scenario and Message Handling in Overload State

| # | Case (Each scenario is based on Tables 3-6) | Node behavior | Action |
|---|---|---|---|
|  |  | guaranteed traffic bandwidth bucket. The message for the non-guaranteed traffic bandwidth bucket will be processed if system's overload policy allows the message. However, lower priority messages are in process for the non-guaranteed traffic bandwidth bucket, thus allow the message for processing. |  |
| 9. | Assume system is running at 100% capacity. Message with priority 18 is received for Rule-Y | Rule-Y guaranteed capacity is exhausted. Also there are no lower priority messages in the guaranteed traffic bandwidth bucket of Rule-Y. Thus, the message will be processed from the non-guaranteed traffic bandwidth bucket. The message for the non-guaranteed traffic bandwidth bucket will be processed if system's overload policy allows the message No lower priority messages are in process for the non-guaranteed traffic bandwidth bucket, thus the message for Rule-Y will be processed if the system has any computing resources available. No more buffer space available to process the message, reject the message. | Message rejected Lower/same priority messages will be rejected first. |

In scenario 1 in Table 7, a message is received from service A for which there is no guaranteed bandwidth service configured. Accordingly, the message will be processed according to the policies defined for the non-guaranteed traffic bandwidth bucket. The message has a priority of 4. In this example, it is assumed that there are messages in the non-guaranteed traffic bandwidth bucket with priority lower than 4 and that there is bandwidth available. Accordingly, the message will be passed or processed and the count for the non-guaranteed bandwidth traffic for priority P4 will be updated.

In scenario 2 in Table 7, another message for Rule-A is received. As with example 1, there is no guaranteed bandwidth service configured for the message, so the message will be passed or processed according to the policies defined for the non-guaranteed traffic bandwidth bucket. In scenario 2, the message has a priority of 18. It is assumed that there are no messages in the non-guaranteed bandwidth bucket with priority lower than 18. Accordingly, the message will be passed or processed if there is bandwidth available for the non-guaranteed traffic bandwidth messages of priority 18. If such bandwidth is not available, the message will be rejected.

In scenario 3, a message with priority 18 for Rule-A is received. However, it is assumed that the system is running at 100% capacity. Since there is no guaranteed bandwidth service configured for Rule-A, no lower priority messages in process in the non-guaranteed traffic bandwidth bucket, and no system capacity available, the message will be rejected.

In scenario 4 in Table 7, a message with priority 20 is received for Rule-X. Guaranteed bandwidth service is configured for Rule-X. It is also assumed that there is quota available within the guaranteed rate for Rule-X. Accordingly, the message will be passed or processed and the rate for priority 20 traffic of Rule-X will be updated.

In scenario 5 in Table 7, a message with priority 20 for Rule-X is received. In this example, it is assumed that the system is running at 100% capacity but there is quota available within the guaranteed rate for messages of Rule-X. Accordingly, the messages will be passed or processed, and the quota will be updated for priority 20 and Rule-X. It should be noted that the system will reject messages in the non-guaranteed traffic bandwidth bucket when the system is running at 100% capacity even if the messages have higher priority than messages that are allowed within the reserved quota for a given service.

In scenario 6 in Table 7, a message with priority 4 is received for Rule-Y. It is also assumed that the Rule-Y guaranteed capacity is exhausted. However, there are messages with lower priority than 4 in the guaranteed traffic bandwidth bucket of Rule-Y. Accordingly, the message will be allowed from the guaranteed traffic bandwidth bucket for Rule-Y and the guaranteed traffic bandwidth traffic rate for priority P4 will be updated for Rule-Y. For any lower priority messages that matches Rule-Y, will be processed under non-guaranteed traffic bandwidth. If required, those messages will be rejected In scenario 7 in Table 7, a message with priority 6 is received for Rule-Y. It is also assumed that the Rule-Y guaranteed capacity is exhausted and there are no lower priority messages in the guaranteed traffic bandwidth bucket for Rule-Y. Accordingly, the message will be processed from the non-guaranteed traffic bandwidth bucket. The message with either be processed or rejected based on the policy defined for the non-guaranteed traffic bandwidth bucket.

In scenario 8, it is assumed that the system is running at 100% capacity and a message with priority 6 is received for Rule-Y. It is also assumed that the Rule-Y guaranteed capacity is exhausted, and there are no lower priority messages in the guaranteed traffic bandwidth bucket for Rule-Y. Thus, the message will be processed from the non-guaranteed traffic bandwidth bucket. The message will be allowed or rejected based on its priority and the policies configured for the non-guaranteed traffic bandwidth bucket.

In scenario 9, it is assumed that the message is running at 100% capacity. A message with priority 18 is received for Rule-Y. It is also assumed that Rule-Y guaranteed capacity is exhausted, and there are no lower priority messages in the guaranteed traffic bandwidth bucket for Rule-Y. Thus, the message will be processed from the non-guaranteed traffic bandwidth bucket. In this example, it is assumed that there are no lower priority messages in the non-guaranteed traffic bandwidth bucket since the system is running at 100% capacity and there is no more buffer space to process the message, the message will be rejected.

Figure 6:
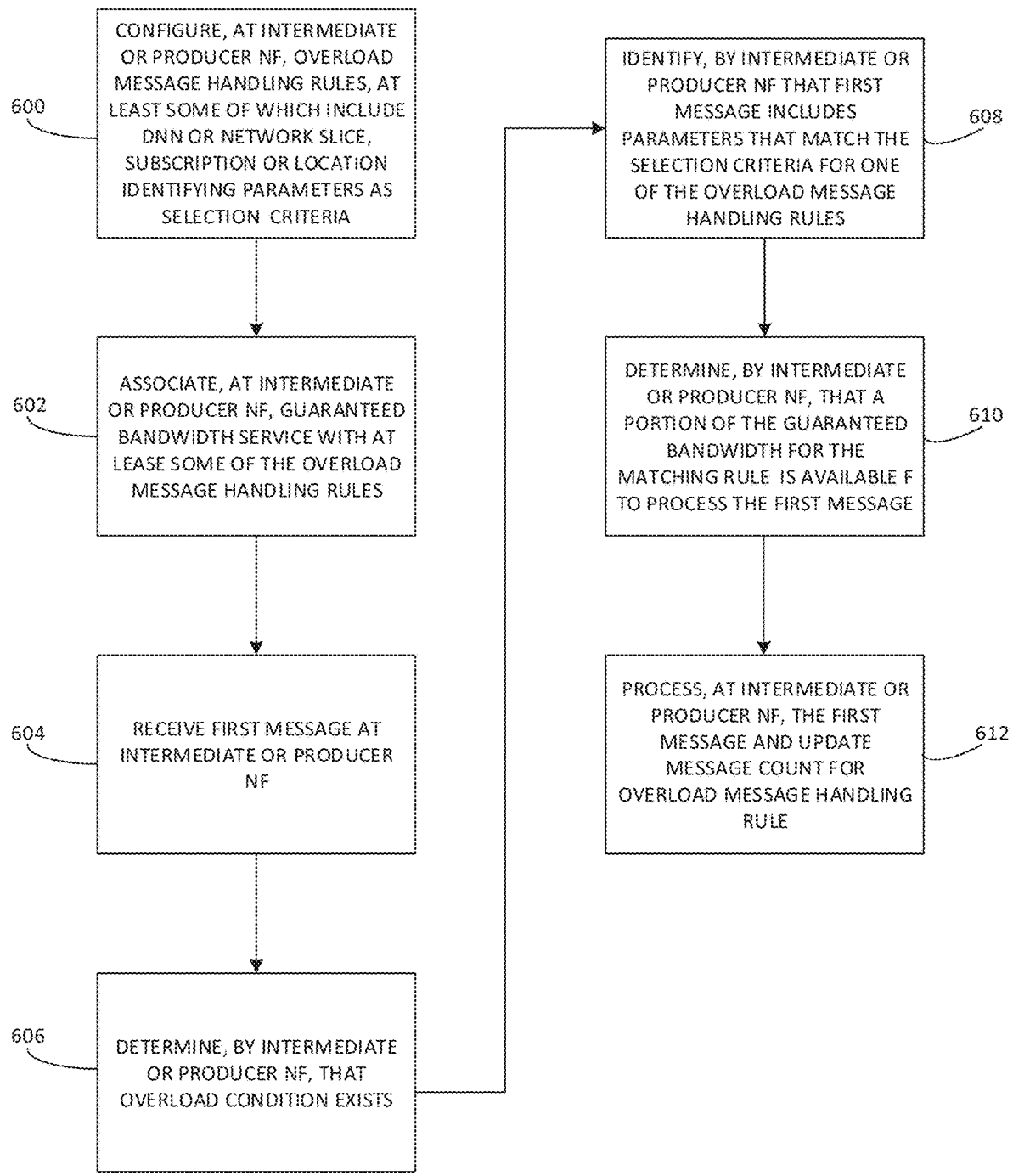
FIG. 6 is a flow chart illustrating an exemplary process for 5G rules-based overload control.

FIG. 6 is a flow chart illustrating an exemplary process for providing rules-based overload control at an intermediate or producer NF. Referring to FIG. 6, in step 600, the process includes configuring, at an intermediate or producer NF, overload message handling rules, at least some of which include a DNN or a network slice, subscription, or location or any other attributed defined by 3GPP or vendor, identifying parameters as rule selection criteria. For example, a network operator or an NF vendor may configure overload control rules for an intermediate or producer NF that specify DNNs, S-NSSAIs, SUPIs, or other parameters as selection criteria.

In step 602, the process includes associating, at the intermediate or producer NF, guaranteed bandwidth service with at least some of the overload message handling rules. For example, the network operator or NF vendor may configure a reserved portion of the NF's bandwidth for some or all of the overload control rules. When the NF is in an overload condition, messages matching one of the rules will be processed using the guaranteed bandwidth reserved for the node.

In step 604, a message is received at the intermediate or producer NF. For example, the intermediate or producer NF may receive a message relating to a 5G transaction, such as service request for a service from a network function, such as a PCF.

In step 606, it is determined that an overload condition exists. The overload condition may be an overload condition of the entire intermediate or proxy NF or an overload condition affecting one of many services provided by the intermediate or producer NF. For example, a message may be received at an SCP, an SEPP, a service mesh node, or a producer NF, such as a PCF or UDM. "Overloaded state" means that the utilization of the intermediate or producer NF has crossed an operator-defined threshold, such as 80% of the available capacity for processing messages.

In step 608, the process includes identifying, by the intermediate or producer NF, that the message includes parameters that match the rule selection criteria for one of the overload message handling rules. For example, the intermediate or producer NF may determine that a message includes a DNN, S-NSSAI, or other parameter or combination of parameters that matches the selection criteria provisioned for one of the overload message handling rules.

In step 610, the process includes determining, by the intermediate or producer NF, that a portion of the guaranteed bandwidth for the matching rule is available to process the message. For example, if the message includes parameters that match one of the overload message handling rules, step 610 may include reading the message count for the rule and determining that the message count is less than the message count threshold for the guaranteed bandwidth for the particular rule.

In step 612, the process includes processing the message using the guaranteed bandwidth for the matching rule and updating the message count for that rule. For example, if the node is an intermediate node e.g., SCP, or SEPP or service mesh, processing the message may include forwarding the message to a producer NF. If the node is a producer NF, processing the message may include processing the message according to the service provided by that NF type. For example, if the producer NF is a PCF, processing the message may include responding to a policy request from a consumer NF. Updating the message count may include updating the count associated with the bucket corresponding to the rule.

The subject matter described herein allows operators to provide guaranteed bandwidth to messages relating to different DNNs or network slices without having to rely on consumer NFs to correctly set 5G message priority parameters. Guaranteed bandwidth processing can be selectively applied to DNNs or network slices, which allows messages of the same type to be treated differently.

The disclosure of each of the following references is hereby incorporated herein by reference in its entirety.

REFERENCES

3GPP TS 29.500, Technical Specification Group Core Network and Terminals; 5G System; Technical Realization of Service Based Architecture; Stage 3 (Release 16) V16.0.0, (2019-06).

3GPP TS 29.510, Technical Specification Group Core Network and Terminals; 5G System; Network Function Repository Services; Stage 3 (Release 16) V16.0.0 (2019-06).

3GPP TS 29.512, Technical Specification Group Core Network and Terminals; 5G System, Session Management Policy Control Service, Stage 3, (Release 16) V16.4.0 (2020-03)

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for rules-based overload control for 5G services, the method comprising:
   configuring, at an intermediate node or a producer network function (NF), overload message handing rules, wherein at least some of the rules include destination network name (DNN) or a network slice, subscription or location identifying parameter as rule selection criteria;
   associating, at the intermediate node or the producer NF, a guaranteed processing bandwidth of the intermediate node or the producer NF, with at least some of the overload message handling rules;
   receiving a first message at the intermediate node or the producer NF;
   determining, by the intermediate node or the producer NF, that an overload condition exists;
   identifying, by the intermediate node or the producer NF, that the first message includes parameters that match the rule selection criteria for one of the overload message handling rules;
   determining, by the intermediate node or the producer NF, that a portion of the guaranteed processing bandwidth of the intermediate node or the producer NF for the matching overload message handling rule is available to process the first message; and
   processing, by the intermediate node or the producer NF and using a portion of the guaranteed processing bandwidth of the intermediate node or the producer NF for the matching overload message handling rule, the first message and updating a message count for the overload message handling rule.

2. The method of claim 1 wherein configuring the overload message handling rules includes configuring rules that treat messages of the same service type differently based on the DNN or network slice, subscription, or location identifying parameter.

3. The method of claim 1 wherein configuring the overload message handling rules includes configuring rules that treat messages of the same service type differently based on defined parameters or a combination of parameters.

4. The method of claim 1 wherein associating a guaranteed processing bandwidth of the intermediate node or the producer NF with at least some of the overload message handling rules includes associating at least some of the overload message handling rules with buckets and configuring a message count corresponding to bandwidth guaranteed for each rule with its respective bucket.

5. The method of claim 4 comprising tracking utilization of the bandwidth guaranteed for each rule by keeping a count of the number of messages matching a rule for each bucket.

6. The method of claim 1 comprising creating dynamic overload message handling rules using information obtained from response messages and using the dynamic overload message handling rules to ensure that messages relating to a common session are processed by a common processor of the intermediate node or the producer NF.

7. The method of claim 1 wherein the intermediate node or the producer NF comprises a security edge protection proxy (SEPP), a service communications proxy (SCP), or a service mesh node.

8. The method of claim 1 wherein the intermediate node or the producer NF comprises the producer NF.

9. The method of claim 1 comprising configuring, at the intermediate node or the producer NF, a non-guaranteed bandwidth bucket usable for tracking bandwidth of the intermediate node or the producer NF available to messages that do not match one of the overload message handling rules for which a guaranteed bandwidth of the intermediate node or the producer NF is configured.

10. The method of claim 9 comprising:
    receiving a second message at the intermediate node or the producer NF;
    determining that the second message does not match one of the overload message handling rules for which a guaranteed bandwidth of the intermediate node or the producer NF is configured;
    determining, using the non-guaranteed bandwidth bucket, that non-guaranteed bandwidth is available for the second message; and
    processing the message using the non-guaranteed bandwidth.

11. A system for rules-based overload control for 5G services, the system comprising:
    an intermediate node or a producer network function (NF) including at least one processor;
    an overload control configuration interface associated with the intermediate node or the producer NF for providing for configuring overload message handing rules used by the intermediate node or the producer NF to govern processing of messages during overload conditions, wherein at least some of the rules include destination network name (DNN) or a network slice, subscription or location identifying parameter as rule selection criteria and for associating a guaranteed bandwidth service associated with at least some of the overload message handling rules; and
    an overload controller implemented by the intermediate node or the producer NF for receiving a first message, determining that an overload condition exists, identifying that the first message includes parameters that match the rule selection criteria for one of the overload message handling rules, determining that a portion of the guaranteed bandwidth for the matching overload message handling rule is available to process the first message, forwarding the first message for further processing by the intermediate node or the producer NF, and updating a message count for the matching overload message handling rule.

12. The system of claim 11 wherein the overload control configuration interface provides for configuring of rules that treat messages of the same service type differently based on the DNN or the network slice identifying parameter.

13. The system of claim 11 wherein the overload control configuration interface provides for configuring of rules that treat messages of the same service type differently based on defined parameters or a combination of parameters.

14. The system of claim 11 wherein 1 wherein the overload control configuration interface provides for associating at least some of the overload message handling rules with buckets and configuring a message count corresponding to bandwidth guaranteed for each rule with its respective bucket.

15. The system of claim 14 wherein the overload controller tracks utilization of the bandwidth guaranteed for each rule by keeping a count of the number of messages matching a rule for each bucket.

16. The system of claim 11 wherein the overload controller creates dynamic overload message handling rules using information obtained from response messages and using the dynamic overload message handling rules to ensure that messages relating to a common session are processed by a common processor of the intermediate node or the producer NF.

17. The system of claim 11 wherein the intermediate node or the producer NF comprises a service communications proxy (SCP), a security edge protection proxy (SEPP), or the producer NF.

18. The system of claim 11 wherein the overload control configuration interface provides for configuration of a non-guaranteed bandwidth bucket usable for tracking bandwidth of the intermediate node or the producer NF available to messages that do not match one of the overload message handling rules for which a guaranteed bandwidth of the intermediate node or the producer NF is configured.

19. The system of claim 18 wherein the overload controller is configured to receive a second message, determine that the second message does not match one of the overload message handling rules for which a guaranteed bandwidth of the intermediate node or the producer NF is configured, determine, using the non-guaranteed bandwidth bucket, that non-guaranteed bandwidth is available for processing the second message, and forward the second message for further processing the message using the non-guaranteed bandwidth.

20. A non-transitory computer readable medium having stored thereon executable instructions that when executed by a processor of a computer control the computer to perform steps comprising:

configuring, at an intermediate node or a producer network function (NF), overload message handing rules, wherein at least some of the rules include destination network name (DNN) or a network slice, subscription or location identifying parameter as rule selection criteria;

associating, at the intermediate node or the producer NF, a guaranteed processing bandwidth of the intermediate node or the producer NF, with at least some of the overload message handling rules;

receiving a first message at the intermediate node or the producer NF;

determining, by the intermediate node or the producer NF, an overload condition exists;

identifying, by the intermediate node or the producer NF, that the first message includes parameters that match the rule selection criteria for one of the overload message handling rules;

determining, by the intermediate node or the producer NF, that a portion of the guaranteed processing bandwidth of the intermediate node or the producer NF for the matching overload message handling rule is available to process the first message; and processing, by the intermediate node or the producer NF and using a portion of the guaranteed processing bandwidth of the intermediate node or the producer NF for the matching overload message handling rule, the first message and updating a message count for the overload message handling rule.

* * * * *

UNITED STATES PATENT AND TRADEMARK OFFICE
CERTIFICATE OF CORRECTION

| | |
|---|---|
| PATENT NO. | : 11,425,598 B2 |
| APPLICATION NO. | : 16/914231 |
| DATED | : August 23, 2022 |
| INVENTOR(S) | : Krishan et al. |

It is certified that error appears in the above-identified patent and that said Letters Patent is hereby corrected as shown below:

On the Title Page

Item (57), under Abstract, Line 3, delete "handing" and insert -- handling --, therefor.

On page 3, Column 1, under Other Publications, Line 55, delete "Feb. 5, 2007 ." and insert -- Feb. 5, 2007). --, therefor.

On page 3, Column 2, under Other Publications, Line 20, delete "Opinoin" and insert -- Opinion --, therefor.

In the Drawings

On sheet 6 of 6, in FIG. 6, under Reference Numeral 602, Line 4, delete "LEASE" and insert -- LEAST --, therefor.

On sheet 6 of 6, in FIG. 6, under Reference Numeral 610, Line 5, delete "F" and insert -- NF --, therefor.

In the Specification

In Column 2, Line 30, delete "handing" and insert -- handling --, therefor.

In Column 2, Line 40, delete "handing" and insert -- handling --, therefor.

In Column 3, Line 62, delete "handing" and insert -- handling --, therefor.

In Column 4, Line 65, delete "handing" and insert -- handling --, therefor.

In Column 6, Line 42, delete "(loT)" and insert -- (IoT) --, therefor.

Signed and Sealed this
Twenty-first Day of February, 2023

Katherine Kelly Vidal
*Director of the United States Patent and Trademark Office*

CERTIFICATE OF CORRECTION (continued)
U.S. Pat. No. 11,425,598 B2

In Column 9, Lines 44-45, delete "Sm Policy" and insert -- SmPolicy --, therefor.

In Column 10, Line 32, delete "handing" and insert -- handling --, therefor.

In Column 11, Line 13, delete "processed)" and insert -- processed). --, therefor.

In Column 14, Line 22, delete "bucketId" and insert -- bucketId. --, therefor.

In Column 14, Line 65, delete "NF." and insert -- NF --, therefor.

In Column 15, Line 27, delete "scenarios)" and insert -- scenarios). --, therefor.

In Column 16, Line 65, delete "PO" and insert -- P0 --, therefor.

In Column 16, Line 66, delete "PO" and insert -- P0 --, therefor.

In Column 19, Line 20, delete "Rule-X" and insert -- Rule-X. --, therefor.

In Column 19, Line 26, delete "Rule-X" and insert -- Rule-X. --, therefor.

In Column 21, Line 35, delete "message" and insert -- message. --, therefor.

In Column 23, Line 11, delete "rejected" and insert -- rejected. --, therefor.

In Column 24, Line 62, delete "(2020-03)" and insert -- (2020-03). --, therefor.

In the Claims

In Column 25, Line 5, in Claim 1, delete "handing" and insert -- handling --, therefor.

In Column 26, Line 24, in Claim 11, delete "handing" and insert -- handling --, therefor.

In Column 26, Line 54, in Claim 14, after "11" delete "wherein 1".

In Column 27, Line 29, in Claim 20, delete "handing" and insert -- handling --, therefor.